United States Patent
McGregor

(10) Patent No.: US 6,825,798 B2
(45) Date of Patent: Nov. 30, 2004

(54) ROD ANTENNA WITH INSTALLATION THREAD

(75) Inventor: Graham Fraser McGregor, Peterborough (CA)

(73) Assignee: Siemens Milltronics Process Instruments Inc., Ontario (CA)

( * ) Notice: Subject to any disclaimer, the term of this patent is extended or adjusted under 35 U.S.C. 154(b) by 0 days.

(21) Appl. No.: 10/358,778

(22) Filed: Feb. 4, 2003

(65) Prior Publication Data

US 2003/0169197 A1 Sep. 11, 2003

(30) Foreign Application Priority Data

Feb. 4, 2002 (CA) .............................................. 2370433

(51) Int. Cl.$^7$ .......................... G01S 13/08; G01R 27/32
(52) U.S. Cl. ...................................... 342/124; 324/644
(58) Field of Search ................................ 342/124, 128, 342/127, 123, 134; 324/644; 73/290 R

(56) References Cited

U.S. PATENT DOCUMENTS

| | | | | |
|---|---|---|---|---|
| 6,155,112 A | * | 12/2000 | Eckert et al. ............. | 73/290 V |
| 6,404,382 B2 | * | 6/2002 | Fehrenbach et al. ........ | 342/124 |
| 6,499,346 B1 | * | 12/2002 | Wien et al. ............... | 73/290 R |
| 6,614,391 B1 | * | 9/2003 | Burger et al. ............... | 342/124 |

* cited by examiner

Primary Examiner—Bernarr E. Gregory
Assistant Examiner—Brian Andrea
(74) Attorney, Agent, or Firm—Merchant & Gould P.C.

(57) ABSTRACT

An antenna assembly suitable for use with a microwave-based level measurement system mounted on a vessel. The antenna assembly includes an installation thread, a shielded extension, and a rod antenna. The antenna assembly is screwed into a threaded portion in the opening of the vessel. The antenna assembly may be formed as a single integral unit molded from a polymer material. The antenna assembly may also be constructed with the installation thread, the shielded extension and the rod antenna comprising individual polymeric components which are welded together to form a unitary assembly. The polymer material is selected based on chemical resistant properties according to the application.

19 Claims, 2 Drawing Sheets

ROD ANTENNA WITH INSTALLATION THREAD

FIELD OF THE INVENTION

The present invention relates to antennas, and more particularly to an antenna configuration for a radar-based level measurement instrument or time of flight ranging system.

BACKGROUND OF THE INVENTION

Time of flight ranging systems, are commonly used in level measurement applications, and are referred to as level measurement systems. Level measurement systems determine the distance to a reflector, i.e. reflective surface, by measuring how long after transmission of energy pulses or waves, an echo is received. Such systems typically utilize ultrasonic pulses, pulse radar signals, or microwave signals.

Pulse radar and microwave-based level measurement systems are preferred in applications where the atmosphere in the container is subject to large temperature changes, high humidity, dust and other types of conditions which can affect propagation. To provide a sufficient receive response, a high gain antenna is typically used. High gain usually translates into a large antenna size.

Two types of antenna designs are typically found in microwave-based level measurement systems: rod antennas and horn antennas. Rod antennas have a narrow and elongated configuration and are suitable for containers having small opening/flange sizes and sufficient height for accommodating the antenna. Horn antennas, on the other hand, are wider and shorter than rod antennas. Horn antennas are typically used in installations with space limitations, for example, vessels or containers which are shallow.

The level measurement instrument comprises a housing and a waveguide (i.e. the antenna). The level measurement instrument is mounted on top of a container or vessel and the antenna extends into the vessel. The level measurement instrument is typically bolted to a flange around the opening in the container. The housing holds the electronic circuitry. The antenna is coupled to the housing and extends into the vessel, and the antenna functions as a transducer and is excited by the circuitry to transmit electromagnetic energy pulses into the vessel, and receives the pulses that are reflected by the surface of the material contained in the vessel. To provide a good seal between the antenna and the flange opening o-rings and gaskets are employed. Typically, antenna configurations utilize o-rings or gasket internally to their assemblies to provide an antenna/vessel mounting configuration that is liquid tight.

It will be appreciated that the addition of o-rings and gaskets adds to the installation procedure. In addition, these components provide a potential failure point if not periodically inspected and replaced as necessary.

Accordingly, there remains a need for an antenna configuration for microwave or radar-based level measurement systems which overcomes these deficiencies.

BRIEF SUMMARY OF THE INVENTION

The present invention provides an antenna configuration suitable for use in pulse radar or microwave-based time of flight ranging systems and level measurement instruments.

In a first aspect, the present invention provides an antenna structure suitable for use in a level measurement instrument for measuring the level of a material held in a container, the antenna structure comprises: (a) an upper section connected to the level measurement instrument, the upper section includes an installation thread which couples a matching thread portion on the container; (b) a lower section having an antenna, the antenna is responsive to the level measurement instrument for emitting electromagnetic energy pulses and receiving electromagnetic energy pulses reflected by the material held in the container.

In a further aspect, the present invention provides a level measurement system comprising: (a) a transducer for emitting electromagnetic energy and coupling reflected electromagnetic energy; (b) a controller having a receiver component and a transmitter component; (c) the transducer having an input port operatively coupled to the transmitter component and being responsive to the transmitter component for emitting the electromagnetic energy, and the transducer includes an output port operatively coupled to the receiver component for outputting reflected electromagnetic energy coupled by the transducer; (d) the receiver component converts the reflected electromagnetic energy into corresponding electrical signals, and the controller includes a program component for determining the distance travelled by the electromagnetic energy; and (e) the transducer includes an antenna assembly, the antenna assembly has an upper section for connecting to the level measurement instrument, the upper section includes an installation thread, and a lower section has an antenna, the antenna is responsive to the level measurement instrument for emitting electromagnetic energy pulses and receiving electromagnetic energy pulses reflected by a material held in a container.

In another aspect, the present invention provides a radar-based level measurement system for determining the level of a material contained in a container, and the system comprises: (a) a transducer for emitting radar pulses and coupling radar pulses reflected from the surface of the material; (b) a controller has a receiver component and a transmitter component; (c) the transducer has an input port operatively coupled to the transmitter component and responsive to the transmitter component for emitting the radar pulses, and the transducer includes an output port operatively coupled to the receiver component for outputting the reflected radar pulses coupled by the transducer; (d) the receiver component converts the reflected radar pulses into corresponding electrical signals, and the controller includes a program component for determining the distance travelled by the radar pulses; and (e) the transducer includes an antenna structure having an upper portion for connecting to the level measurement instrument, the upper portion includes a threaded section, the threaded section couples a threaded section in the container, and a lower portion has an antenna, the antenna is operatively coupled to the level measurement instrument to emit electromagnetic energy pulses and to receive electromagnetic energy pulses reflected by the material held in the container.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is now made to the accompanying drawings which show, by way of example, a preferred embodiment of the present invention, and in which.

DETAILED DESCRIPTION OF THE PREFERRED EMBODIMENT

Figure 1:
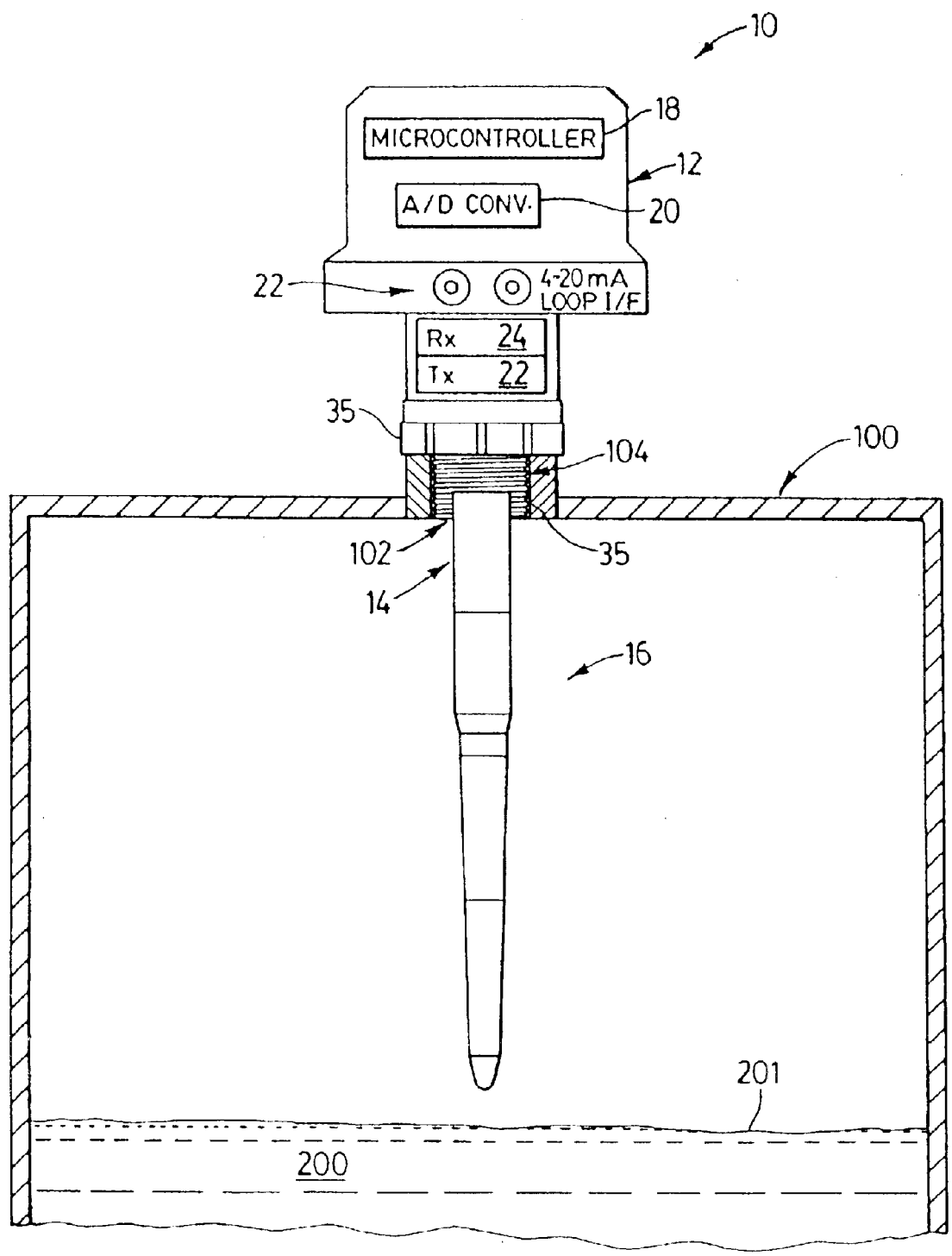
FIG. 1 shows in diagrammatic from a radar-based level measurement instrument with an antenna structure according to the present invention.

Reference is made to FIG. 1, which shows in diagrammatic from a radar-based or microwave-based level measurement instrument 10 with an antenna assembly or configuration according to the present invention.

As shown in FIG. 1, the level measurement instrument 10 is mounted on top of a container 100 which holds a material 200, e.g. liquid, slurry, or solid, and the level measurement instrument 10 is used to determine the level of the material 200 held in the container 100. The container 100 has an opening 102 with a threaded portion 104. The level measurement instrument 10 is coupled, e.g. threaded or screwed, to the threaded portion 104 of the opening 102. The level measurement instrument 10 comprises a housing 12 and a transducer 14. The housing 12 contains electrical/electronic circuitry as described below. The transducer 14 extends into the interior of the container 100 and comprises an antenna assembly 16 in accordance with the present invention.

The level measurement instrument 10 includes a microcontroller unit 18, and an analog-to-digital converter 20. The level measurement instrument 10 may also include a current loop interface (4–20 mA) module 22. The transducer 14 is coupled to the microcontroller 18 through a transmitter 22. The microcontroller 18 uses the transmitter 22 to excite the transducer 14 to emit electromagnetic energy in the form of radar pulses or microwaves. The reflected electromagnetic energy, i.e. reflected radar pulses, are coupled by the transducer 14 and converted into an electric signal by a receiver 24.

The level measurement instrument 10 is installed in the container 100, for example a tank or vessel, containing the material 200, such as a liquid, with a level determined by the top surface of the material 200. The top surface of the material 200 provides a reflective surface or reflector, indicated by reference 201, which reflects the radar pulses generated from the emitter on the transducer 14, i.e. the antenna assembly 16. The reflected radar pulse is coupled by the transducer 14 and converted by the receiver 24 into an electrical signal. The received electrical signal is sampled and digitized by the A/D converter 20 for further processing by the microcontroller 18. The microcontroller 18 executes an algorithm which identifies and verifies the received signal and calculates the range of the reflective surface 201, i.e. the time it takes for the reflected pulse to travel from the reflective surface 201 to the receiver 24 on the transducer 14. From this calculation, the distance to the surface of the material 201 and thereby the level of the material, e.g. liquid 200 in the vessel 100, is determined. The microcontroller 18 also controls the transmission of data and control signals through the current loop interface 22. The microcontroller 18 is suitably programmed to perform these operations as be within the understanding of those skilled in the art. These techniques are described in prior patents of which U.S. Pat. No. 4,831,565 and U.S. Pat. No. 5,267,219 are exemplary.

As shown in FIG. 1, the antenna assembly 16, extends from the opening 102 into the interior of the vessel or tank 100. The antenna assembly 16 is screwed into the threaded portion 104 in the opening 102 of the tank 100 and functions as the transducer to provide a combined transmitting and receiving device. The antenna assembly 16 includes an appropriate internal metallic structure (not shown) and transmits electromagnetic signals onto the surface 201 of the material 200 in the vessel 100. The electromagnetic signal is reflected by the surface 201 of the material 200, and an echo signal is received by the antenna assembly 16. The echo signal is processed as described above to calculate the level of the material 200 in the vessel 100.

Figure 2:
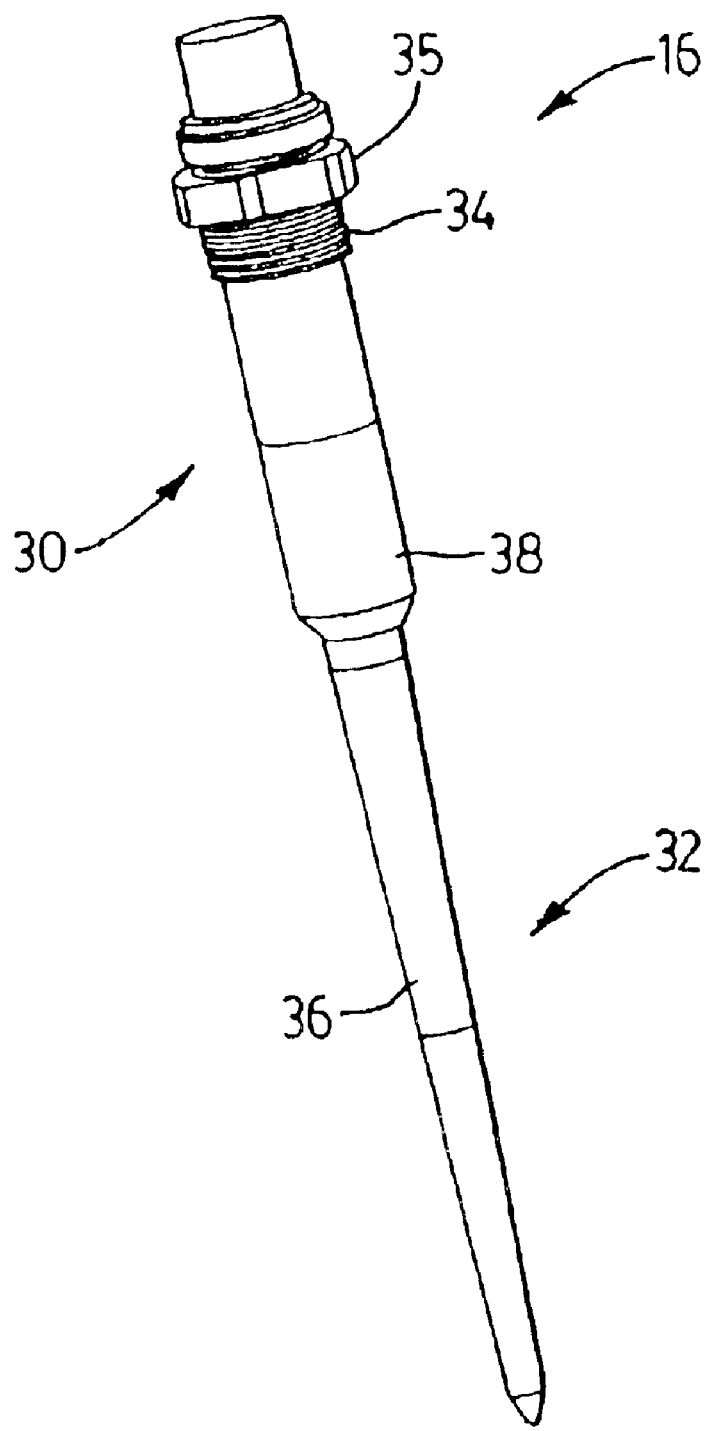
FIG. 2 shows an antenna structure according to the present invention.

Reference is next made to FIG. 2, which shows in more detail the antenna assembly 16 according to the present invention. The antenna assembly 16 comprises an upper section 30 and a lower section 32. The upper section 30 is coupled to the housing 12 and operatively coupled to a transducer interface in the instrument 10. The lower section 32 comprises a rod antenna 36 which launches the microwave pulses into the vessel 100 and receives the reflected pulses.

According to one aspect of the invention, the upper section 30 includes an installation thread 34. The installation thread 34 may be formed integrally with the upper section 30 of the antenna assembly 16. The installation thread 34 has a pitch and diameter which matches threaded portion 104 in the opening 102 of the vessel 100 (indicated by reference 105 in FIG. 1). Advantageously, the installation thread 34 mates with the vessel opening, e.g. screws into the opening, and eliminates the need for an o-ring or gasket to seal the opening. As shown, the antenna assembly 16 may include a threaded nut 35 which is tightened against the opening 102 in the vessel 100 (as shown in FIG. 1).

According to another aspect, the upper section 30 of the antenna assembly 16 includes a shielded extension, indicated by reference 38 in FIG. 2. The shielded extension 38 provides isolation for the antenna assembly 16 thereby allowing the antenna assembly 16 to be installed in a vessel 100 having a long narrow opening or nozzle. This configuration for the antenna assembly 16 eliminates nozzle interference by keeping the microwave energy contained until it is emitted by the rod antenna 36 formed in the lower section 34 within the vessel 100.

The antenna assembly 16 is constructed from a chemically resistant polymer which is chosen based on the particular application. Suitable polymers include PTFE, PFA, Polypropylene, Polyethylene.

The antenna configuration according to the present invention may be formed from a single material based on the chemical compatibility of the application, i.e. the material in the vessel. The antenna assembly 16 may be formed as a single unit which is molded as a single unit or one piece with the installation thread. The antenna assembly 16 may also be constructed using individual or discrete polymeric components for the upper section 30 and the installation thread 34, and the lower section 32 and the rod antenna 36. The upper 30 and lower 32 section are then welded together using known techniques compatible with the material composition for the components, for example, ultrasonic welding, hot plate welding, and spin welding. The shielded section 38 may molded in the upper section 30 (or the lower section 32) for the single molded construction, or molded as a separate component which is welded to the upper 30 and lower 32 sections using known techniques.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An antenna structure suitable for use in a level measurement instrument for measuring the level of a material held in a container, said antenna structure comprising:
   (a) an upper section for connecting to the level measurement instrument, said upper section including an installation thread, said installation thread coupling with a matching thread portion in the container;
   (b) a lower section having an antenna, said antenna being responsive to the level measurement instrument for emitting electromagnetic energy pulses and receiving electromagnetic energy pulses reflected by the material held in the container;
   (c) said upper section and said lower section being formed from the same material and said upper section and said lower section forming an external antenna structure for an internal waveguide.

2. The antenna structure as claimed in claim 1, further including a shield extension between said upper section and said lower section.

3. The antenna structure as claimed in claim 1, wherein said upper section and said lower section are molded as a single unit from a polymer material.

4. The antenna structure as claimed in claim 2, wherein said upper section, said lower section, and said shield extension are molded as a single unit.

5. The antenna structure as claimed in claim 4, wherein said upper section, said lower section, and said shield extension are formed from a polymer material.

6. The antenna structure as claimed in claim 1, wherein said upper section and said lower section comprise discrete components, said components being welded together.

7. The antenna structure as claimed in claim 6, further including a shield section, said shield section being welded to said upper section and said lower section.

8. A level measurement system comprising:
   (a) a transducer for emitting electromagnetic energy and coupling reflected electromagnetic energy;
   (b) a controller having a receiver component and a transmitter component;
   (c) the transducer having an input port operatively coupled to the transmitter component and being responsive to the transmitter component for emitting the electromagnetic energy, and the transducer includes an output port operatively coupled to the receiver component for outputting reflected electromagnetic energy coupled by the transducer;
   (d) the receiver component converts the reflected electromagnetic energy into corresponding electrical signals, and the controller includes a program component for determining the distance traveled by the electromagnetic energy; and
   (e) the transducer includes an antenna assembly, the antenna assembly having an upper section for connecting to the level measurement instrument, said upper section including an installation thread, and a lower section having an antenna, said antenna being responsive to the level measurement instrument for emitting electromagnetic energy pulses and receiving electromagnetic energy pulses reflected by a material held in a container;
   (f) said upper section and said lower section being formed from the same material and said upper section and said lower section forming an external antenna structure for an internal waveguide.

9. The level measurement system as claimed in claim 8, further including a shield extension between said upper section and said lower section.

10. The level measurement system as claimed in claim 8, wherein said upper section and said lower section are molded as a single unit from a polymer material.

11. The level measurement system as claimed in claim 8, wherein said upper section and said lower section comprise individual components, said components being welded together.

12. A radar-based level measurement system for determining the level of a material contained in a container, and the system comprising:
   (a) a transducer for emitting radar pulses and coupling radar pulses reflected from the surface of the material;
   (b) a controller has a receiver component and a transmitter component;
   (c) the transducer has an input port operatively coupled to the transmitter component and responsive to the transmitter component for emitting the radar pulses, and the transducer includes an output port operatively coupled to the receiver component for outputting the reflected radar pulses coupled by the transducer;
   (d) the receiver component converts the reflected radar pulses into corresponding electrical signals, and the controller includes a program component for determining the distance traveled by the radar pulses; and
   (e) the transducer includes an antenna structure having an upper portion for connecting to the level measurement instrument, said upper portion including threaded section, said threaded section coupling a threaded section in the container, and a lower portion having an antenna, said antenna being operatively coupled to the level measurement instrument to emit electromagnetic energy pulses and to receive electromagnetic energy pulses reflected by the material held in the container;
   (f) said upper portion and said lower portion being formed from the same material and said upper portion and said lower portion forming an external antenna structure for an internal waveguide.

13. The radar-based level measurement system as claimed in claim 12, further including a shield extension between said upper portion and said lower portion.

14. The radar-based level measurement system as claimed in claim 12, wherein said upper portion and said lower portion are molded as one unit from a polymer material.

15. The radar-based level measurement system as claimed in claim 12, wherein said upper portion and said lower portion comprise separate components, said components being welded together.

16. An antenna configuration suitable for use in a level measurement instrument for measuring the level of a material held in a container, said antenna configuration comprising:
   an upper section for connected to the level measurement instrument, said upper section including an installation thread, said installation thread coupling with a matching thread portion in the container;
   a lower section having an antenna, said antenna being responsive to the level measurement instrument for emitting electromagnetic energy pulses and receiving electromagnetic energy pulses reflected by the material held in the container;
   said upper section and said lower section being molded in one piece from a polymer material to form an external antenna structure for an internal waveguide.

17. An antenna configuration suitable for use in a level measurement instrument for measuring the level of a material held in a container, said antenna configuration comprising:

an upper section for connected to the level measurement instrument, said upper section including an integral installation thread;

a lower section having an integral antenna, said antenna being responsive to the level measurement instrument for emitting electromagnetic energy pulses and receiving electromagnetic energy pulses reflected by the material held in the container;

said upper section and said lower section comprising polymeric components and said components being welded together;

said upper and said lower sections forming an external antenna structure for an internal waveguide.

18. An antenna configuration suitable for use in a level measurement instrument for measuring the level of a material held in a container, said antenna configuration comprising:

an upper section for connected to the level measurement instrument, said upper section including an integral installation thread;

a lower section having an antenna, said antenna being operatively coupled to the level measurement instrument for emitting electromagnetic energy pulses and receiving electromagnetic energy pulses reflected by the material held in the container;

a shield extension between said upper section and said lower section said upper section, said lower section and said shield extension being molded in one piece from a polymer material and forming an external antenna structure for an internal waveguide.

19. An antenna configuration suitable for use in a level measurement instrument for measuring the level of a material held in a container, said antenna configuration comprising:

an upper section for connected to the level measurement instrument, said upper section including an integral installation thread, said installation thread coupling with a matching thread portion in the container;

a lower section having an integral antenna, said antenna being responsive to the level measurement instrument for emitting electromagnetic energy pulses and receiving electromagnetic energy pulses reflected by the material held in the container;

a shield extension between said upper section and said lower section said upper section, said lower section and said shield extension formed as discrete components and said discrete components being welded together and forming an external antenna structure for an internal waveguide.

* * * * *